United States Patent [19]
Susin

[11] 3,790,324
[45] Feb. 5, 1974

[54] EXTENSION RUNNER SYSTEM SPRUE ARRANGEMENTS FOR MOLDING APPARATUS

[75] Inventor: Victor G. Susin, Naperville, Ill.
[73] Assignee: Young Rubber Co., Naperville, Ill.
[22] Filed: June 14, 1972
[21] Appl. No.: 262,526

[52] U.S. Cl. ............................................. 425/247
[51] Int. Cl. ............................................ B29h 1/06
[58] Field of Search... 425/191, 247, 243, 248, 250, 425/197, 257; 249/105, 107, 110

[56] References Cited
UNITED STATES PATENTS
| | | | |
|---|---|---|---|
| 2,880,460 | 4/1959 | Monett | 425/191 |
| 3,159,878 | 12/1964 | Scott | 249/105 X |
| 2,672,653 | 3/1954 | Simpkins | 425/250 X |

FOREIGN PATENTS OR APPLICATIONS
1,194,192   6/1970   Great Britain

Primary Examiner—J. Spencer Overholser
Assistant Examiner—John S. Brown
Attorney, Agent, or Firm—Alter, Weiss, Whitesel & Laff

[57] ABSTRACT

An extension runner system sprue arrangement for molding apparatus that includes a bushing for coupling the extension runner system to the mold cavities. The bushing is shaped and arranged to control friction generated heat of plasticized material passing through the bushing. This enables vernier control of the temperature for the material being molded and thereby enables faster and more efficient molding operations.

9 Claims, 4 Drawing Figures

PATENTED FEB 5 1974 3,790,324
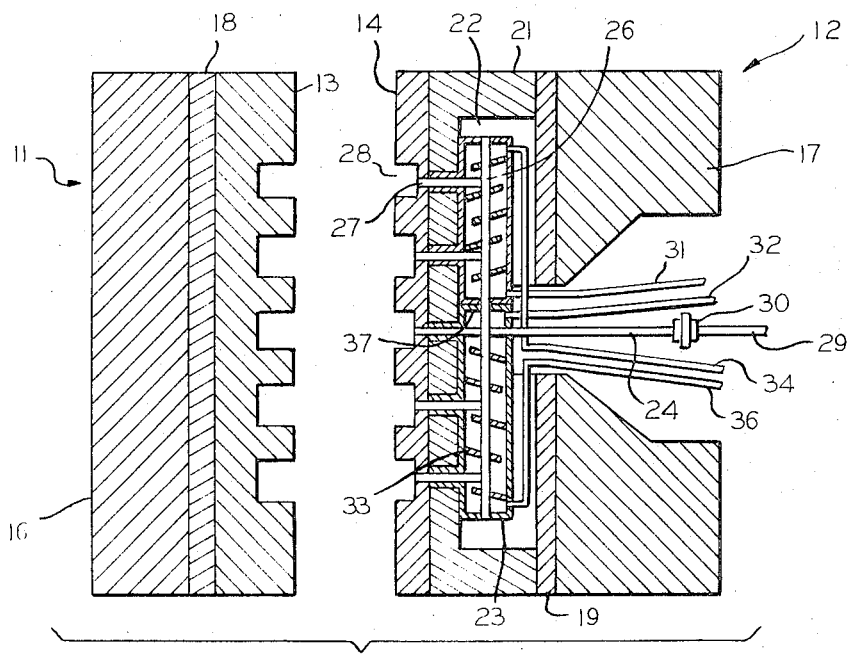
FIG.1
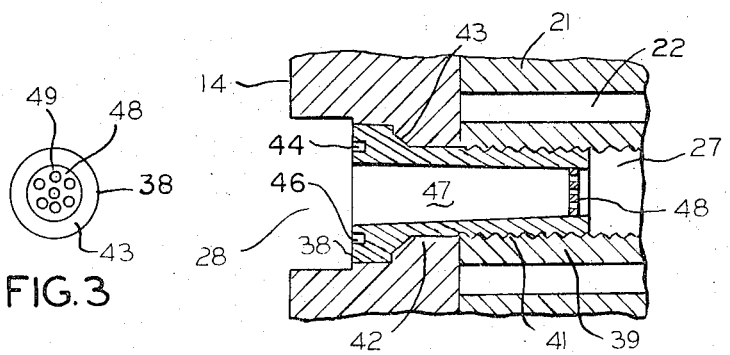
FIG.3
FIG.2
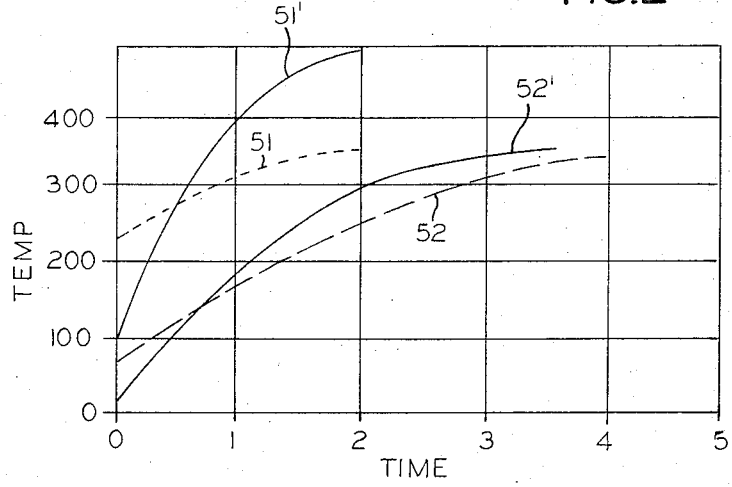
FIG.4

EXTENSION RUNNER SYSTEM SPRUE ARRANGEMENTS FOR MOLDING APPARATUS

This invention is concerned with molding apparatus and more particularly with the devices and means for connecting extension type runner systems to the mold plates, especially when the molding apparatus is used for molding thermo-setting elastomer material.

In the molding of elastomer material, such as rubber, there have always been problems with the runner systems. The problems in general are that of trying to pervent the loss of the rubber that occurs when the rubber sets in the runner. This results not only in an inordinate amount of down time while the runner system is cleaned, in addition to the added expense caused by the lost rubber in the runner.

Runnerless systems wherein extension manifolds are used are those such as disclosed in my prior patent, U.S. Pat. No. 3,661,487 issued on May 9, 1972. In the extension system disclosed therein the high pressure tubing means terminates in a high pressure manifold surrounded by low pressure tubing carrying a heat exchange fluid for heating and/or cooling the plasticized material in the high pressure manifold. It is necessary, of course, to attach the extension system into the mold plate so close as possible to the cavity and in a manner such that there is no leakage of the plasticized rubber at the entrance to the mold plate.

There have been systems devised for preventing such leakage. Included among these systems have been a variety of valves at the entrance to the mold plates. The problem with the valve type of device is wear and tear on the valves. Usually material with a high heat-resistant characteristic is utilized. However, it has been found that such products do not stand up against the wear and tear of the molding operations.

Another method for preventing leakage has been the use of bushings coupling the mold plates to the sprues. The sprues are threaded to receive the bushings which fit through entrances or ports on the mold plates and are screwed into the threaded sprues. This type of bushing has helped to overcome the problem of leakage between the sprue and the mold plate.

The above mentioned "runnerless" apparatus is used to obtain the maximum efficiency in the molding operation. The maximum efficiency occurs when the plasticized rubber is injected or forced into the mold with the greatest possible speed so that the mold cavities can be floodingly filled and then cured in the shortest possible time. Extension systems utilizing water jackets around the high pressure tubing have proved useful for adjusting and maintaining the temperatures to obtain the maximum efficiency in the molding operation. However, an inherent drawback in such systems is the time lapse in changing the heat content of the fluid in the water jacket caused by the mass of the heat exchange fluid, the specific heat and other unalterable characteristics. Thus, there is a necessity for a vernier control of the temperature of the plasticized rubber as it enters the mold cavity.

Accordingly, an object of this invention is to provide a new and unique device for coupling runner systems to mold plates.

Another object of this invention is to provide a new and unique device for affecting the temperature of the plasticized rubber in a controlled manner as it enters the mold cavity from the extension runner system.

A related object of this invention is to enable a massive amount of plasticized material to flood the mold cavity under pressure and to reach a setting temperature in the shortest possible time in the mold cavity while yet remaining in a plasticized condition in extension runner systems.

Yet another and related object of this invention is to be able to change the original characteristics of the coupling device for connecting the extension runner systems to the mold cavities so that it may be used with different types of rubber in varying the heat and temperature of the runner as it enters the mold plates.

A preferred embodiment of the invention comprises an extension runner system using, for example, a removable extension of the high pressure system of an injection cylinder comprising high pressure tubing. The high pressure tubing terminates in a manifold having a plurality of sprues that are coupled to entrances or ports on the stationary mold plate using a threaded bushing type device. The threaded device has an orifice therethrough with a reverse taper. That is, the orifice is larger on the cavity side than on the sprue side. Also, adjacent to the sprue side of the orifice there is a bulkhead that has drill holes therein through which the plasticized material is forced. The number and size of holes in the bulkhead determines the friction, and therefore the heat of the friction applied to the plasticized material passing through the orifice. By utilizing the bushing with the described configuration, the temperature in the extension runner system can be maintained lower because the plasticized material is heated by the heat of friction as it enters into the mold cavity. Thus, the plasticized material can flood the mold cavity and yet remain in the plasticized condition in the extension runner system while easily solidifying in the mold cavity to make for the most efficient molding process.

The above mentioned objects and features of the invention will now be explained in detail with the aid of the accompanying drawings, wherein:

FIG. 1 shows in sectional view mold plates and associated platens utilizing the extension runner system that is used in molding type apparatus;

FIG. 2 shows in sectional form sprue bushing details of the coupling system between the mold plate and the extension runner system;

FIG. 3 is an end view of the bushing used in coupling the sprue on the extension runner system to the mold plate; and FIG. 4 graphically depicts how the heat of friction is used to vary the temperature time characteristic curve of the plasticized material.

Referring now to the drawings, therein like characters of reference illustrate corresponding parts throughout. FIG. 1 is a sectional view showing the mold and associated platens in the extension runner system to give the overall background picture of the inventive device.

As depicted in FIG. 1 a movable mold assembly is generally shown on the left hand side of the figure while a stationary mold assembly 12 is generally shown on the right hand side. The movable mold plate is shown as 12 and the stationary mold plate is shown as 14. Each of the mold plates is backed by a platen, thus there is the movable platen 16 and the fixed or stationary platen 17.

Disposed between the platen and the mold plate are means for controlling the temperature of the mold plate. More particularly, hot plate 18 is positioned between moving platen 11 and movable mold plate 13. Similarly, hot plate 19 is juxtaposed to fixed platen 17.

Means are provided for controlling the temperatures of the plasticized material until the material is actually transferred into the molds. More particularly, an adapter plate 21 is provided. There is a cavity 22 in the adapter plate 21 for receiving a water jacket 23. The water jacket works in cooperation with high pressure tubing 24 that is used to transfer the plasticized material between the sprue of the "torpedo" (not shown) of the molding apparatus into the mold plate.

More particularly, high pressure tubing 24 is coupled to manifold section 26 that terminates in a plurality of sprues, such as prue 27, leading into mold cavity 28. It should be understood that the mold cavities can also be mold passages leading to the mold cavities.

The high pressure tubing 24 is coupled to the high pressure tubing 29 of the "torpedo" (not shown) with any well known means, such as union 30.

The water jacket is provided with heat exchange fluid through means such as low pressure tubing 31 and 32. The water jacket itself is equipped with baffles such as baffle 33 which assures the maximum circulation of the heat exchange liquid. Low pressure outlet tubing 34 and 36 are provided for removing the heat exchange fluid from the jacket. It should be noted that outlet tubing 34 works in cooperation with inlet tubing 31 to circulate the heat exchange fluid through one-half of the water jacket while inlet tube 32 and outlet tube 36 are used for circulating the heat exchange fluid in the other half of the water jacket. The water jacket itself is divided into separate compartments through the use of bulkhead 37.

Means are provided for coupling the sprue, such as sprue 27, to the mold plate and at the same time for adding to the control of the temperature of plasticized material that is being transferred between the high pressure tubing and the mold cavities. The coupling of the sprue 27 and the mold plate 14 is shown in greater detail in FIG. 2 which is an enlarged sectional view of sprue 27 connected to cavity or passage 28.

More particularly, as shown in FIG. 2, mold 14 has the cavity or passage therein 28; and, sprue 27 is shown as an outlet from the manifold leading directly to the mold entrance port into the cavity or passageway. The section of the adapter plate shown in FIG. 2, of course, is that section immediately adjacent to the mold plate 14. It can be seen that section of the adapter plate is threaded at 39 with an internal female thread to receive the threaded portion 41 of coupling bushing 38. The section 42 of the coupling bushing adjacent to the entrance way of the mold is preferably cylindrically shaped and smooth at its outer periphery. Following section 42 is a truncated conical section 43 that conforms to a depressed conical section in the mold plate. The head of the bushing 38 is shown as flat and conforming to a flat section in the mold's entrance port.

Means are provided for turning the bushing into the threads and thereby pulling the water jacket sprue 27 and adapter plate 21 into an abutting relationship with the mold plate 14. The means could be wrench holes such as 44 and 46 or any other well known means for providing a grip on a bolt.

The threaded bushing is provided with reverse tapered passageway 47 leading from the sprue into the cavity 28. This reverse tapered passageway 47 has been found to be particularly expeditious for enabling the plasticized material to flood the mold cavity under pressure during the transfer of the plasticized material from a high pressure tubing 24 into the mold.

Heat adjusting means are provided adjacent to the entrance of the bushing passageway 47. More particularly, a bulkhead 48 is provided. As best seen in FIG. 3 the bulkhead has a plurality of apertures therein, such as aperture 49. The size and number of the apertures in the bulkhead 48 determine the heat of the friction that is generated when the plasticized material passes through the bulkhead 48 of the reverse tapered passageway 47.

FIG. 4 shows characteristic curves of thermosetting elastomer material. Curve 51 is a characteristic curve of such material in the injection molding process. The knee portion where the curve turns and flattens out is where solidification of the plasticized material occurs. The dashed line curve in 52 shows a characteristic curve of such material in transfer molding apparatus. Here again, above the knee where the curve flattens out is where the material solidifies. Curve 51' shows how the characteristic curve is changed by the device 38, having the bulkhead 48 with the apertures therein. Similarly curve 52' shows the effects of the device 38 on the transfer molding characteristic. As can be seen in curve 51' the heat of friction causes the transfer curve to rise more rapidly and therefore higher temperature with a resultant improved viscosity characteristics are obtained. Further, curve 51' shows that the initial temperature does not need to be as high and therefore the probability of premature setting of the material is diminished. The curve 52' also reveals the same variation of heat characteristics. Thus by utilizing the threaded bushing the molding operation is improved.

The most expeditious way of using the coupling bushing device is to start with only a few apertures in the bulkhead 48. The cut and try method is used in setting up the molding apparatus until the most efficient temperatures are arrived at by adding apertures and/or enlarging the apertures already in the bulkhead.

While the principles of the invention have been described above in connection with specific apparatus and applications, it is to be understood that this description is made only by way of example and not as a limitation on the scope of the invention.

I claim:

1. An extension runner system sprue arrangement for molding apparatus,
    said molding apparatus including movable and stationary mold plates, mold cavities in said mold plates,
    entrance port means in said stationary mold plates for receiving the sprues of the runner systems,
    said sprues having internal threading therein,
    said system comprising bushing means for coupling the extension system to the mold cavities,
    said bushing means having external threading thereon for meshing with said internal threading so that when said bushing extends through the entrance port means of the mold plate and is threaded into the sprues, the extension system is contiguously coupled to the mold cavities, and
    said bushing means comprising apertured bulk-head means for adjusting the heat of friction caused by the plasticized material passing through the bushing means by varying the number of apertures in the bulk-head means.

2. The extension runner system sprue arrangement of claim 1, wherein said bushing means has an aperture therethrough to couple the sprues to the entrance port means.

3. The extension runner system sprue arrangement of claim 2, wherein said aperture is reverse tapered.

4. The extension runner system sprue arrangement of claim 3, wherein said means for adjusting the heat of friction comprises bulkhead means in said aperture, and at least one passage hole means in said bulkhead means.

5. An extension runner system arrangement for molding apparatus, said molding apparatus including movable and stationary mold plates, mold cavities in said mold plates, entrance port means in said stationary mold plates for receiving the sprues of the runner systems, said system comprising bushing means for coupling the extension system to the mold cavities, said bushing means including means for drawing the sprues of the extension runner system into contiguous relationship with the stationary mold plate to couple said sprues to said entrance port means, said bushing means having an aperture therethrough, said aperture being reverse tapered, bulk-head means in said reverse tapered aperture, and at least one passage hole through said bulk-head means, said passage hole varying the heat of friction caused by the plasticized material in the extension runner system as it passes through said bushing means.

6. The extension runner system sprue arrangement for molding apparatus of claim 5 wherein said means for drawing said sprues into abutting relationship with said stationary mold plate comprises an externally threaded end on said bushing, internal threads mating with said external threads at the outlet of said sprue, and a portion on the other end of said bushing wider than the entrance port of said mold plate, and means for threading said bushing into said sprue and to thereby draw said mold plate and said sprue into contiguous relationship.

7. The extension runner system sprue arrangement of claim 6, wherein said bushing further has a truncated conical portion adjacent to said wider portion, and wherein the entrance port means of said mold plate is shaped to conform to said truncated conical portion.

8. An extension runner system sprue arrangement for a molding apparatus, said molding apparatus including movable and stationary mold plates, mold cavities in said mold plates, entrance port means in said stationary mold plates for receiving the sprues of the runner systems, said system comprising bushing means for coupling the extension system to the mold cavities, said bushing means including means for drawing sprues of the extension runner system into contiguous relationship with stationary mold plates to couple said sprues to said entrance port means, said bushing means having an aperture therethrough, bulk-head means in said aperture having at least one passage hole therein for adjusting the heat of friction of the plasticized material passing through said sprue arrangement, and said bulk-head being adjacent to the sprue end of said aperture.

9. The extension runner system sprue arrangement of claim 8, wherein a plurality of passage holes are in said bulkhead means and wherein some of said passage holes have different diameters.

* * * * *

UNITED STATES PATENT OFFICE
CERTIFICATE OF CORRECTION

Patent No. 3,790,324             Dated February 5, 1974

Inventor(s) Victor G. Susin

It is certified that error appears in the above-identified patent and that said Letters Patent are hereby corrected as shown below:

Col. 3, line 15, after "such as" "prue" should be -- sprue -- .

Signed and sealed this 16th day of July 1974.

(SEAL)
Attest:

McCOY M. GIBSON, JR.          C. MARSHALL DANN
Attesting Officer              Commissioner of Patents